United States Patent [19]

Bazuin

[11] 4,327,612
[45] May 4, 1982

[54] TURRET LATHE

[75] Inventor: Johannes Bazuin, Cincinnati, Ohio

[73] Assignee: LeBlond Incorporated, Cincinnati, Ohio

[21] Appl. No.: 167,692

[22] Filed: Jul. 10, 1980

[51] Int. Cl.³ .......................... B23B 3/00; B23B 29/00
[52] U.S. Cl. ...................................... 82/2 R; 82/36 A
[58] Field of Search ................................. 82/2 R, 36 A

[56] References Cited

U.S. PATENT DOCUMENTS

| | | | |
|---|---|---|---|
| 1,268,277 | 6/1918 | Ransdall . | |
| 3,134,276 | 5/1964 | Abrams . | |
| 4,015,491 | 5/1977 | Peter | 82/2 R |
| 4,051,750 | 10/1977 | Berly | 82/2 R |
| 4,180,894 | 1/1980 | Link | 82/2 R |
| 4,286,483 | 9/1981 | Henneberg et al. | 82/2 R |

FOREIGN PATENT DOCUMENTS 516023  1/1931  Fed. Rep. of Germany .
603982 10/1934  Fed. Rep. of Germany .

*Primary Examiner*—Harrison L. Hinson
*Attorney, Agent, or Firm*—Wood, Herron & Evans

[57] ABSTRACT

A turret lathe is disclosed in which the turret supports a plurality of tools at a plurality of tool block locations formed thereon which are located at varying angular positions on the turret. These locations are so positioned as to maximize the number of tools supportable by the turret while still enabling all of the tools to be moved through their full cutting range without any one tool interfering with a workpiece or a workpiece supporting chuck while any other tool is operating upon that workpiece. Because the tools are located at varying angular positions on the turret, which positions are not even multiples of one another, the lathe incorporates an indexing control operable to index the turret through those varying angular arcs so as to enable any selected tool to be positioned at the tool cutting station of the machine.

17 Claims, 5 Drawing Figures

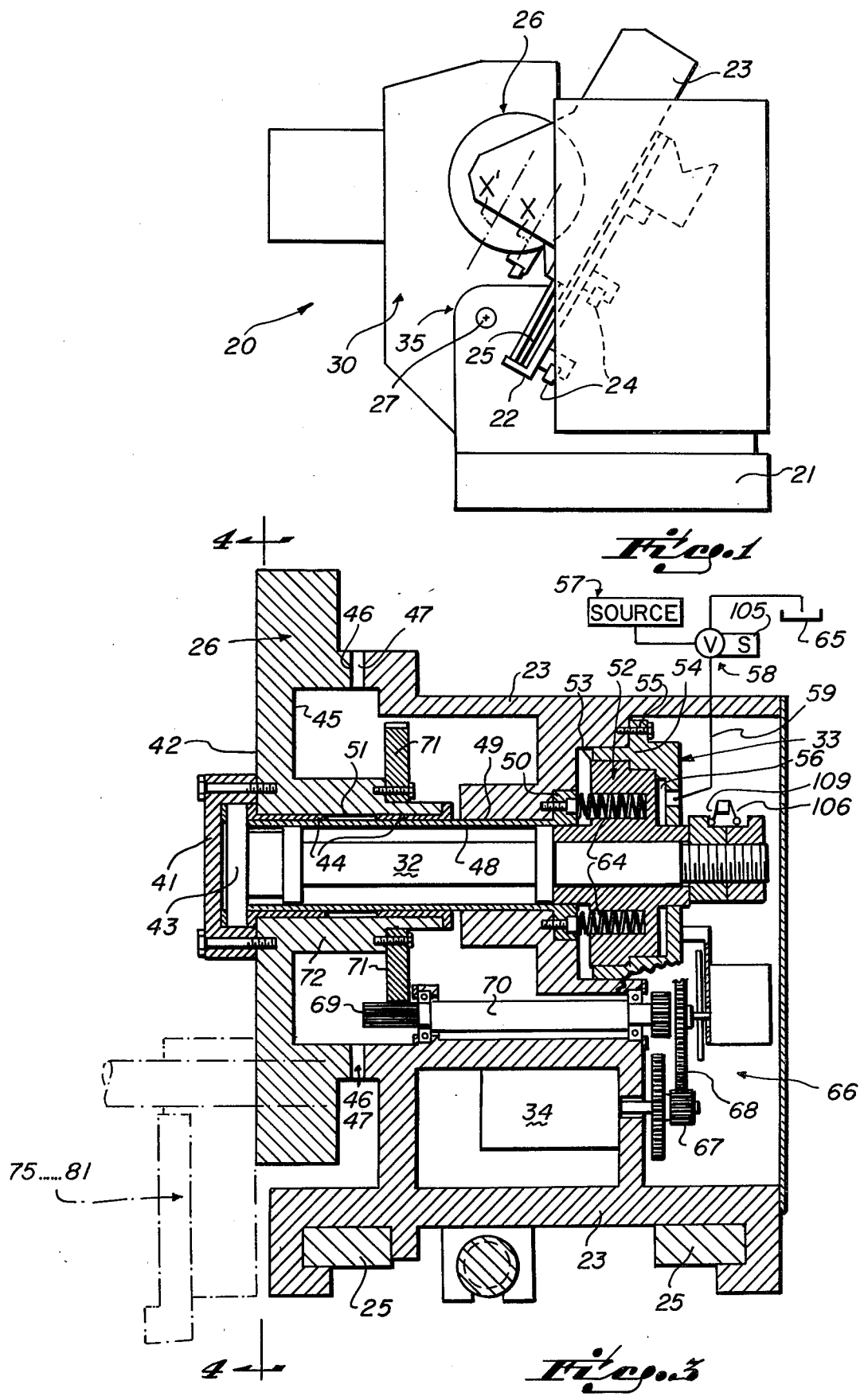

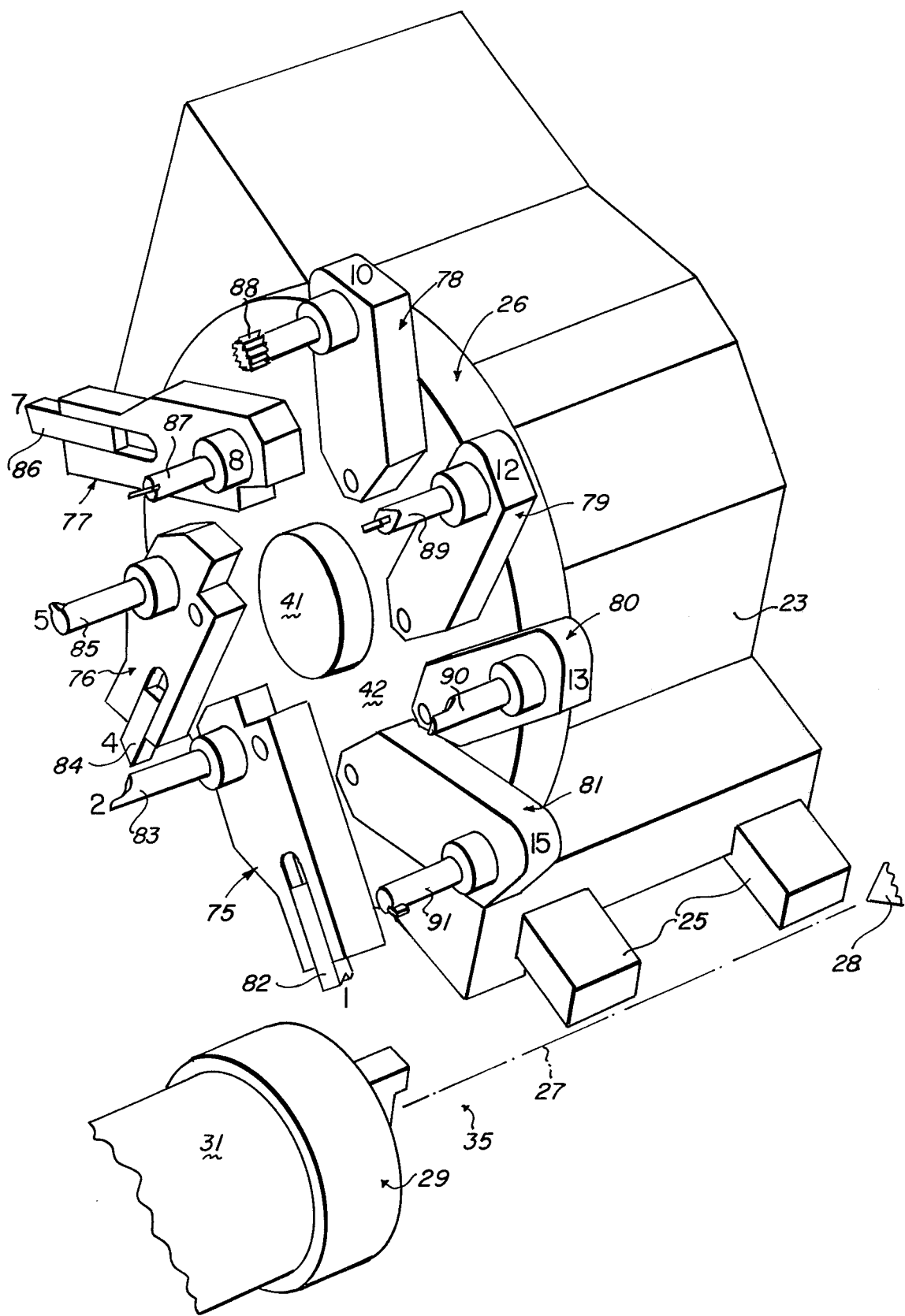

TURRET LATHE

This invention relates to lathes and more particularly to turret type lathes which have a plurality of cutting tools mounted upon a single indexable tool support.

It has long been common in the machine tool industry to mount a plurality of cutting tools upon a single tool supporting block of a lathe or so-called turret, and to selectively move those tools into a cutting station where relative rotational movement between the tool and workpiece effects cutting of the workpiece. The availability of a plurality of tools on the tool turret enables a plurality of different cutting operations to be performed upon a single workpiece or upon a plurality of different workpieces.

Over the past twenty years numerically controlled lathes have gradually taken over an increasingly larger share of the machine tool market. In general, such machines operate upon the principle of a programmed electrical control operating or cycling the machine rather than a human operator.

Numerically controlled lathes are often provided with multiple tools mounted upon a tool turret in order to have available on the machine a plurality of different tools for cutting varying configurations of workpieces. Alternatively, many numerically controlled machines are provided with an automatic tool changing mechanism operable to remove a selected tool from a bank of stored tools and to automatically place that selected tool into the machine. The automatic tool changer provides the machine with greater flexibility and with a greater number of available tools than does a turret type machine. Consequently, an automatic tool changer enables a machine to cut a greater variety of workpieces without the need for a human operator to stop the machine and change tools manually as a part of the set-up for different workpieces.

The greatest shortcoming of numerically controlled lathes equipped with automatic tool changers is the high capital investment cost of these machines. While they are very convenient and cost saving, they are often more costly and complex than is warranted for a particular application. On the other hand, turret type lathes as presently configured, are less costly than automatic tool changer type machines, but they provide a fewer number of available tools capable of being automatically positioned in the tool cutting station of the machine.

There has been a long standing need for a lathe which has a greater tool capacity than that currently associated with turret type machines but without the high capital cost and complexity of current automatic tool changer type machines.

It has therefore been an objective of this invention to provide a lathe which has a greater tool capacity than current turret type lathes but without the complexity and expense of automatic tool changer type machines.

The invention of this application which accomplishes this objective comprises a turret type of numerically controlled machine tool. To my knowledge, until the invention of this application, machine tool turrets have always been so configured as to have the tools located on fixed centers which are equidistantly spaced around the turret. This configuration resulted from the fact that all of the turrets of which I am aware were indexed through fixed arcuate increments to position a selected tool at the cutting station. Generally there are either four or six tools on the turret and the turret is consequently indexed either 90° or 60° during each indexing movement.

I have discovered, and this invention is predicated upon, the concept that a turret type lathe may accommodate a great many more tools if the tools are located on centers which are not equidistantly spaced about the turret, but instead are located as close together on the turret as is possible while still avoiding interference between adjacent tools. Interference occurs when one tool on the turret contacts or "wrecks" with the workpiece or workpiece supporting chuck while any other tool on the turret is machining that workpiece. In other words, according to the practice of this invention, the tools are spaced on the turret as closely together as possible without having one tool interfere with or contact the workpiece while the next adjacent tool is machining that same workpiece. This results in the tools being unevenly spaced around the turret on centers which are not equidistantly spaced from one another. It also results in turrets being specially configured for the tools to be used on a particular size of machine. But, irrespective of the tools utilized on a particular machine, the lathe of this invention is always characterized by a turret having tool locations which are not equidistantly spaced around the turret and having an indexing control operative to selectively locate each of those variable spaced tool locations at the machine cutting station. In other words, lathes incorporating the invention of this application always have tools positioned on the turret at angular locations or on centers which are not even multiples of one another and a control capable of indexing that turret through varying arcuate angles so as to locate those unevenly spaced tools at the tool cutting station of the machine.

A primary advantage of this invention is that it provides a lathe which has many of the advantages of an automatic tool changer type of machine but at substantially less cost.

Still another advantage of this invention is that it enables a greater number of tools to be positioned on a specific size turret lathe with the result that the turret may be reduced in size over what has heretofore been required and that turret size reduction has enabled the size of the overall machine to be reduced.

These and other objects and advantages of this invention will be more readily apparent from the following description of the drawings in which:

FIG. 1 is an end elevational view of a machine incorporating the invention of this application.

FIG. 2 is a diagrammatic perspective view of the tool turret and workpiece chuck of the machine illustrated in FIG. 1.

FIG. 3 is a cross-sectional view though the tool turret of the machine of FIG. 1.

Figure 4:
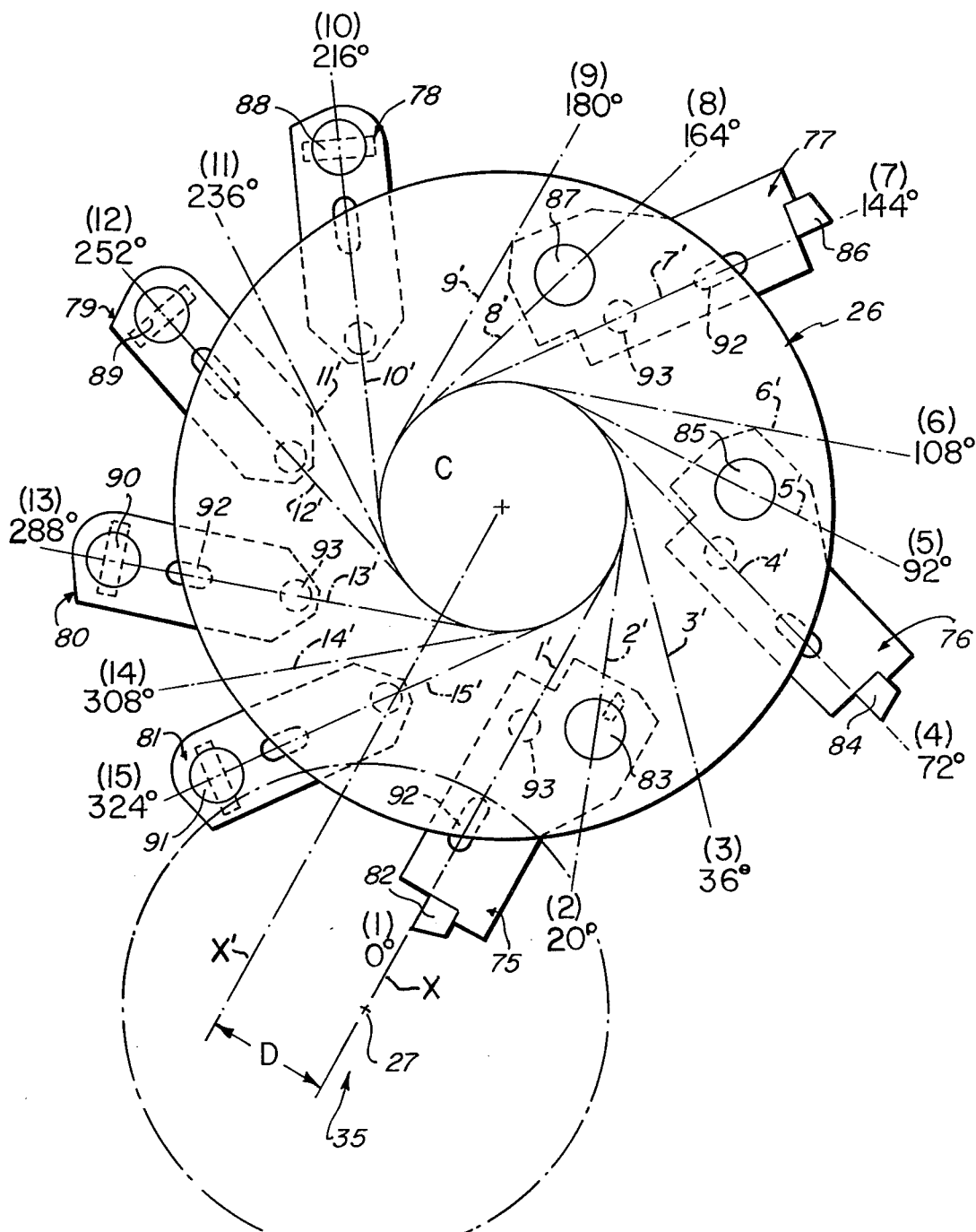
FIG. 4 is a partially diagrammatic view as seen on lines 4—4 of FIG. 3, illustrating the spacing of the tools in the tool turret.

Referring to FIGS. 1 and 2, it will be seen that the invention of this application is illustrated as being embodied on a numerically controlled slant bed turret lathe 20. While the invention has been illustrated as applied to this particular style of lathe, it should be appreciated that the invention may be utilized on any turret type lathe in which it is desirable to maximize the number of cutting tools supported on the machine turret.

The lathe 20 comprises a base 21 upon which there is mounted a carriage 22 and a turret slide 23. The carriage 22 is mounted for longitudinal movement upon a pair of ways 24 and the turret slide is mounted for transverse movement upon a pair of ways 25. These latter ways 25 are fixedly supported, by means not shown, upon the carriage 22. The turret slide 23 thus supports the indexable turret 26 for longitudinal movement with the carriage 22 and transverse movement with the turret slide 23.

A workpiece (not shown) is supported for rotational movement about a fixed axis 27 by a tail stock 28 and chuck 29 (FIG. 3). The tail stock 28 is mounted at one end of the base or bed 21 and is spaced from a head stock 30 of the machine. This head stock 30 is operable to rotatably drive a spindle 31, the end of which carries the workpiece chuck 29.

The machine illustrated in FIG. 1 is commonly referred to as a slant bed lathe because the turret slide ways 25 are located in a plane which slopes at approximately a 60° angle to a horizontal plane. This angulation of the turret slide ways is advantageous for facilitating the removal of chips from the bed of the machine and for facilitating insertion and removal of workpieces into and out of workpiece chucks.

Referring now to FIG. 3 it will be seen that the turret 26 is supported upon a post 32 for both axial and rotational movement on the turret slide. This post is axially movable within the turret slide 23 by a fluid motor 33 and is rotatably movable within that slide by a servo drive motor 34. As explained more fully hereinafter, axial movement of post 32 by the motor 33 effects axial clamping and unclamping movement of the turret relative to the slide while rotational movement of the post 32 by the servo 34 effects indexing movement of the turret 26 so as to locate a selected tool of the turret in the tool cutting station 35 of the machine.

The turret 26 is fixedly secured to the post 32 by a cap 41 which is bolted to the outer face 42 of the turret. This cap is operative to sandwich a radial flange 43 of the post 32 between the cap 41 and one of a pair of bushings 44. This bushing 44 is in turn sandwiched between the inner face of the flange 43 and the outer face 42 of the turret 26. Consequently, any movement of the post 32 and its attached flange 43 results in a corresponding movement of the turret 26.

Fixedly attached to the inner face 45 of the turret 26 is a conventional curvic gear 46. The teeth of this gear 46 mate with the teeth of a second curvic gear 47 fixedly attached to the turret slide 23 such that when the turret 26 is clamped onto this slide, the teeth of these two gears 46, 47 are in mating engagement as shown. In order to rotate the turret relative to this slide, the turret 26 must first be moved axially away from the slide 23 so as to disengage these teeth and thereby unclamp the turret.

The post 32, upon which the turret 26 is mounted, is slideable within a sleeve-like cylinder 48. This cylinder is mounted within a bore 49 of the slide 23 and has a radial flange 50 secured to the slide 23 by bolts. This cylinder extends through a central bore 51 of the turret 26 and supports the turret for sliding and rotational movement upon the pair of bushings 44. Both of these bushings 44 are fixedly secured to the turret by conventional threaded fasteners (not shown).

Axial movement of the turret 26 to effect clamping and unclamping of the turret relative to the slide 23 is caused by the reciprocating piston hydraulic motor 33 mounted on the interior of the slide 23. This motor comprises a piston 52 fixedly secured to the post 32 and reciprocable within a bore 53 of a cylinder 54. This cylinder has a radial flange 55 which is bolted to a shoulder formed on the interior of the turret slide 23 such that the cylinder 54 is fixed relative to the slide 23. Between the piston 52 and the bore of the cylinder there is a fluid chamber 56 which is connected to a source 57 of pressurized fluid via a solenoid controlled valve 58 and a fluid line 59. Springs 64 supported within recesses of the piston 52 bias the piston toward the right as viewed in FIG. 3, in which position the piston and attached post 32 are operative to cause the turret 26 to be maintained in a clamped position. To unclamp the turret, fluid under pressure from source 57 is directed through the solenoid valve 58 to the chamber 56. This results in fluid pressure in the chamber 56 causing the piston 52 to move leftwardly against the bias of the springs 64, thereby causing the post 32 and attached turret 26 to also move leftwardly. This results in disengagement of the curvic gear coupling 46, 47 such that the turret is then free to rotate relative to the slide. When the solenoid valve 58 is de-energized (as explained more fully hereinafter) it results in the line 59 being disconnected from the fluid pressure source 57 and being connected through the valve 58 to a reservoir 65. With the chamber 56 thus effectively open to atmospheric pressure, the piston is moved rightwardly by the springs 64, thereby clamping the turret 26 to the slide 23.

In order to rotate the turret 26 on the slide 23, the servo drive motor 34 is connected to the turret via a gear train 66. This gear train comprises a pinion gear 67 secured to the drive shaft of the motor 34 and a pair of gears 68, 69 secured to opposite ends of a shaft 70. The gear 69 is in driving engagement with a gear 71 bolted to an internal hub 72 of the turret 26. Consequently, rotational movement of the servo drive motor 34 effects rotational movement of the turret drive gear 71 through the gear drive train 66 and thereby rotational movement is imparted to the turret 26.

The slant bed lathe 20 as well as the turret 26 and turret slide 23 heretofore described are all well-known in the prior art and per se form no part of the invention of this application. Rather, the invention of this application is directed to the configuration of the turret on the lathe, the location of tools on the turret (FIGS. 2 and 4), and to the control system (FIG. 5) used to effect indexing of that turret.

Referring to FIG. 4 it will be seen that there are 15 different tool index positions numbered 1-15 angularly spaced about the turret 26. Each of these different index positions is selectively movable into the cutting plane X of cutting station 35 of the machine, as is explained more fully hereinafter.

With reference to FIGS. 1 and 4 it will be seen that the cutting plane X passes through the center line 27 of the workpiece support chuck 29 and is parallel to the ways 25 upon which the turret slide is movable. This cutting plane X is offset from a parallel plane X' which passes through the center line of the turret 26 by a distance D, which distance D is the radius of a tool turret offset circle C (illustrated in phantom lines in FIG. 4). All of the work stations 1-15 are located in planes 1'-15' which are tangential to this circle C. Consequently, rotational movement of the turret 26 will result in each of the planes 1'-15' of the tool stations 1-15 being selectively movable into the cutting plane X of the machine.

Still with reference to FIG. 4, it will be seen that in order to locate the second tool position 2 in the cutting plane X (tool cutting station 35) of the machine, the turret must be indexed 20 degrees. In order to locate the third section 3 of the turret in the cutting plane X of the turret must be indexed 36 degrees, and to locate the fourth station of the turret in the cutting plane X, the turret must be rotated 72 degrees. The angular rotation required to position each of the additional tool positions 5–15 at the cutting station 35 (cutting plane X) appears at the radial end of each of the dashed lines demarking the plane 5′–15′ of the tool positions. It is to be noted that there is a pattern in the spacing between the planes. Specifically, indexing from position 1 to position 2 requires 20 degrees rotation of the turret, from position 2 to position 3 requires 16 degrees of rotation of the turret, and indexing of the turret from position 3 to position 4 requires 36 degrees of rotation of the turret. This pattern is then repeated for the tool positions 5, 6 and 7 in that there is 20 degrees between positions 4 and 5, 16 degrees between positions 5 and 6, and 36 degrees between the positions 6 and 7. This configuration of tool positions is a "non-interference" combination for maximizing a particular combination or mix of outside diameter working tools and inside diameter working tools. Outside working diameter tools are lathe turning tools and inside diameter tools are boring, drilling, and reaming tools. The tools are so positioned that none of the tools will contact the workpiece or chuck while any other tool is working upon the workpiece. Preferably, the positioning of the tools is such that the center line of all inside diameter tools may be traversed to the workpiece center line 27 and the cutting edge of all outside diameter tools may be traversed to the workpiece center line 27 without any interference of the other tools with the workpiece or chuck. The tool mix of drilling, boring, reaming and turning tools is variable and may be changed by selecting different tool blocks 75, 76, 77, 78, 79, 80 and 81 to be mounted upon the turret 26 at the tool stations 1–15.

As illustrated in FIG. 4, the tool blocks 78–81 at stations 10, 12, 13 and 15 are intended to accept only inside diameter tools while the tool blocks 75–77 at stations 1, 4 and 7 are combination tool blocks which accommodate turning tools at stations 1, 4 and 7 and inside diameter tools at stations 2, 5 and 8.

Still, with reference to FIG. 4 it will be seen that there are no tools located at stations 3, 6, 9, 11 and 14, since the tool blocks in the adjacent stations preclude location of additional tool blocks at these five stations. These additional empty stations 3, 6, 9, 11 and 14 are available though for use if a different mix of outside diameter and inside diameter cutting tools is selected.

Cutting tools 82–91 are mounted within the tool blocks 75–81. Each of these tool blocks is located at an index station by a key 92 and guide pin 93. The key 92 and guide pin 93 are both secured to the tool block and fit into an appropriately placed keyway (not shown) and guide pin recess (not shown) in the turret 26. Once positioned by the guide pin and the key, the tool blocks are removably secured to the turret by conventional threaded fasteners (not shown) which extend through the tool block and are threaded into the turret 26.

As described hereinabove, the tool stations 1–15 are located at angular positions on the turret which require the turret to be indexed through 20 degrees, 16 degrees, 36 degrees, or combinations thereof to locate a selected tool position at the cutting station 35. For example, to move the turret from a position in which the tool number 1 is located at the cutting station to a position in which the second tool is located at the cutting station requires 20 degree indexing of the turret, and to move from position number 2 to position number 3 requires 16 degrees of turret rotation, while moving from turret position number 3 to position number 4 requires 36 degrees of rotation. These indexing movements of 20 degrees, 16 degrees and 36 degrees are not even increments of one another. To effect this indexing movement of the turret the servo drive motor 34 is controlled by an electrical control system illustrated in FIG. 5. This control system includes a numerical control unit 100 which controls all functions of the machine. Additionally, this control system includes an indexer control 101, a position feed-back resolver 102, and a drive motor tachometer 103. These components 100, 101, 102 and 103 of the control circuit are all commercially available components. For example, the numerical control unit 100 may be a conventional General Electric 1050HL numerical control system which may be operated either via a manual data input or a programmed taped input. The indexer control 101 may be a conventional indexer manufactured by Control Systems Research Corporation.

In operation, an indexing cycle is initiated by the numerical control unit 100 upon command from either the manual data or the program input. This command signal causes the control unit 100 to energize a solenoid 105 of the valve 58. Energization of this solenoid 105 causes fluid under pressure to be supplied from the source 57 (FIG. 3) to the chamber 56 of the cylinder 54 so as to cause the turret to be moved to an unclamped position in which the gear teeth 46, 47 are disengaged. When the turret is moved to the fully unclamped position such that it is free for rotational movement, a turret unclamp switch 106 (FIGS. 3 and 5) is closed, thereby signaling the numerical control unit 100 that the turret 26 is free for indexing movement. Closing of the switch 106 results in a commanded position signal being transmitted from the numerical control unit 100 to the indexer control 101 via a lead 107. This signal to the indexer control 101 identifies the selected tool position 1–15 to be moved into the cutting station 35 of the machine. The indexer control then causes the drive motor 34 to be energized and to be driven at a speed controlled by a velocity feed-back signal from the tachometer 103. As the turret 26 is driven in rotation its position is fed back into the indexer control via the position feed-back resolver 102. When the turret reaches its commanded position, the indexer control 101 stops actuation of the motor 34 and signals the numerical control unit 100 via an in-position signal on lead 108 that the turret is now in the commanded position. The numerical control unit then de-energizes the turret unclamped solenoid 105, thereby repositioning the solenoid valve 58 (FIG. 3) so as to cause the springs 64 to effect clamping movement of the turret. This clamping movement results in the gear teeth 46 on the turret re-engaging the teeth 47 on the turret slide 23. When the turret is fully clamped, the turret clamp switch 109 closes, thereby signaling the numerical control unit 100 that the indexing movement is complete and that the machining cycle may proceed.

Figure 5:
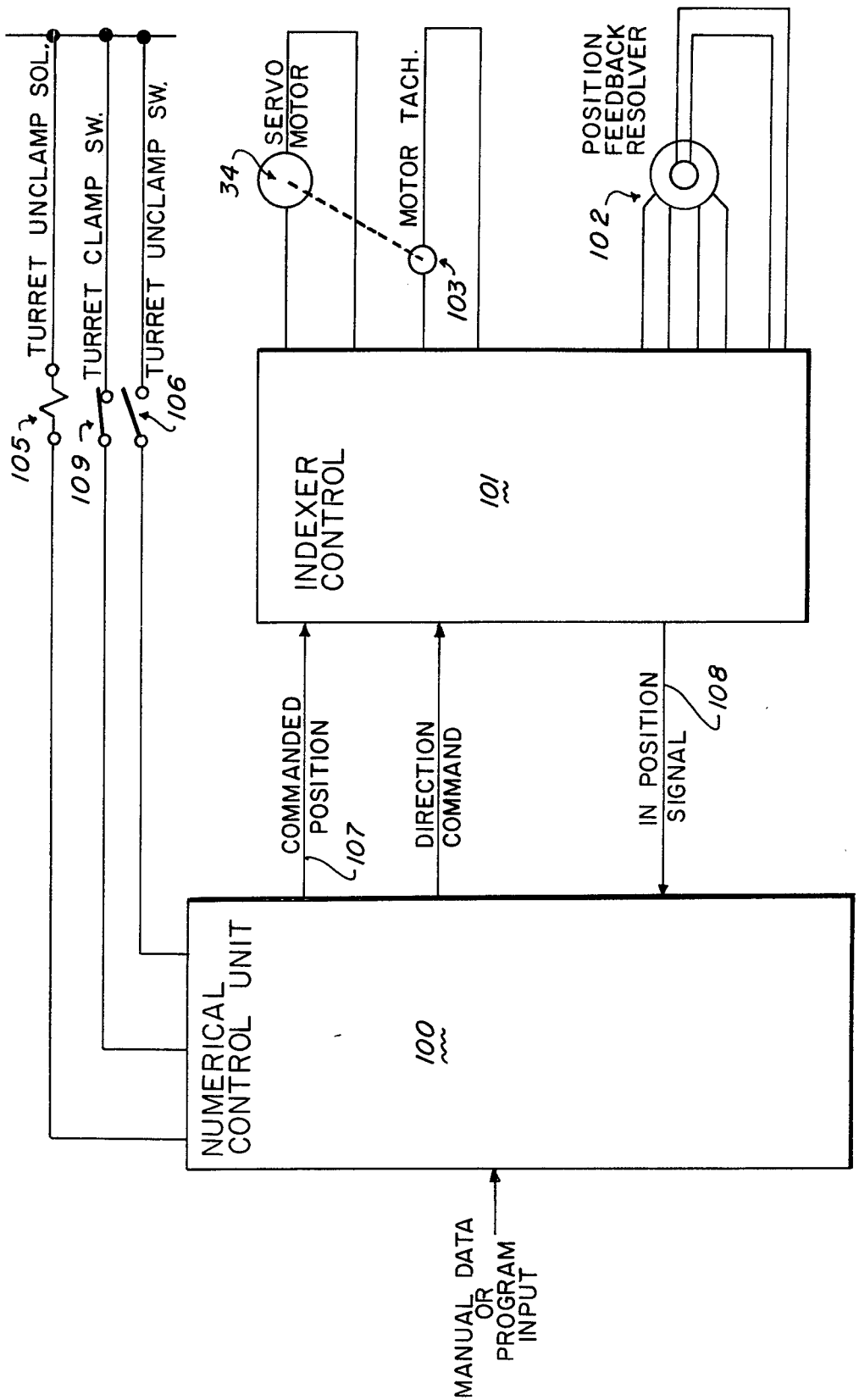
FIG. 5 is a diagrammatic illustration of an electrical circuit utilized in the machine of FIG. 1.

The indexer control 101, while it is a conventional hardware item, must be programmed for each particular turret. That is, the 15 position turret illustrated in this application would require a different program than an 18 position turret which might be used on a different size machine. In all instances though, the control system of FIG. 5 is programmable to accommodate any different combination of tools or different angular positions required to index those tools into the cutting station of the machine. In other words, this control system does not require the tools of the turret to be located at fixed distances from one another, but enables the tools to be positioned in whatever position on the turret maximizes the number of tools in a non-interfering configuration.

It will now be appreciated that the invention of this application is characterized by tools mounted on the turret in angular positions which maximize the number of tools of a particular mix while still avoiding interference of adjacent tools with the workpiece or machine chuck. This number will vary from one tool mix to another and from one size machine to another. It will always though be characterized by tools which are unevenly spaced about the turret and which require a tool indexing control which enables any one of those unevenly spaced tools to be selectively positioned at the cutting station of the machine.

The primary advantage of this invention resides in its ability to accommodate a far greater number of tools on the tool turret than has been heretofore characteristic of turret type lathes. In many applications this greater number of available tools will greatly increase the efficiency of a machine and its ability to manufacture different parts without the need for replacing the turret or repositioning tools on the turret to accommodate differing workpieces.

While I have described only a single preferred embodiment of my invention, persons skilled in this art will appreciate numerous changes and modifications which may be made without departing from the spirit of my invention. Specifically, they will appreciate that tools may be mounted directly to the turret 20 rather than upon tool blocks. They will also appreciate numerous different configurations of tool turrets and tool mixes which will still utilize the invention of my application to achieve the use of a greater number of tools on the tool turret. Therefore, I do not intend to be limited except by the scope of the following appended claims.

I claim:

1. A turret lathe having an indexable turret for supporting a plurality of cutting tools selectively movable into a cutting station, said lathe comprising,
    a bed,
    a carriage longitudinally movable on said bed,
    a turret slide transversely movable on said carriage,
    a headstock for rotatably supporting a workpiece,
    an indexable tool turret rotatably mounted upon said slide,
    a plurality of cutting tool stations upon said tool turret, said tool stations being located at varying angular positions on said turret such that the angular arc between at least one pair of adjacent stations of said turret is an uneven multiple of the angular arc between other adjacent pairs of stations on said turret,
    first motor means for effecting rotational movement of said turret, and
    control means for controlling indexing movement of said turret, said control means being operative to actuate said first motor means so as to effect rotational movement of said turret through varying degrees of angular rotation so as to selectively locate any one of said tool stations at said cutting station.

2. The turret lathe of claim 1 in which said stations are so positioned on said turret that the total number of a particular mix of cutting tools mounted upon said turret is maximized without any one tool interfering with a workpiece supported upon said workpiece support while any other tool is operating within its cutting range upon said workpiece.

3. The turret lathe of claim 1 in which said slide has a gear type coupling element fixedly secured thereon, and said turret has a mating gear type coupling element fixedly secured thereon, second motor means for causing axial movement of said turret, and said control means being operative to cause said second motor means to move said turret axially away from said slide to unclamp said turret, to thereafter effect rotational indexing of said turret, and to subsequently effect axial movement of said turret toward said slide to clamp said turret in a new indexed position.

4. The turret lathe of claim 1 which further includes a plurality of cutting tools, each of said cutting tools being located at one of said tool stations on said turret.

5. The turret lathe of claim 4 which further includes a plurality of tool mounting blocks, each of said cutting tools being mounted in one of said tool mounting blocks, and each of said tool mounting blocks being removably secured to said turret to facilitate removal and replacement of tools on said turret.

6. The turret lathe of claim 5 which further includes tool block locating means at each of said tool stations of said turret.

7. The turret lathe of claim 6 in which said locating means comprises a keyway in said turret at each of said tool stations.

8. The turret lathe of claim 1 in which said control means comprises an electrical control system, said system including a servo drive motor, an electrical indexer control, and a position feedback resolver.

9. The turret lathe of claim 8 in which said control means further includes a numerical control unit for actuating said electrical indexer control.

10. The turret lathe of claim 1 in which the cutting station of said lathe is located in a cutting plane of said lathe which is parallel to the path of movement of said turret slide on said carriage, and said cutting plane being offset from a parallel plane passing through the rotational axis of said turret.

11. A turret lathe having an indexable turret for supporting a plurality of cutting tools selectively movable into a cutting station, said lathe comprising,
    a bed,
    a carriage longitudinally movable on said bed,
    a turret slide transversely movable on said carriage,
    a headstock for rotatably supporting a workpiece,
    an indexable tool turret rotatably mounted upon said slide,
    at least ten cutting tool stations upon said tool turret, said tool stations being located at varying angular positions on said turret such that the angular arc between at least one pair of adjacent stations of said turret is an uneven multiple of the angular arc between other adjacent pairs of stations on said turret,
    servo drive motor means for effecting rotational movement of said turret, and
    control means for controlling indexing movement of said turret, said control means including an indexer control and a position feedback resolver operative to actuate said servo drive motor means so as to effect rotational movement of said turret and selectively locate any one of said tool stations at said cutting station.

12. The turret lathe of claim 11 in which said control means further includes a numerical control unit for actuating said electrical indexer control.

13. A slant bed turret lathe having an indexable turret for supporting a plurality of cutting tools selectively movable into a cutting station, said lathe comprising, a bed, a carriage longitudinally movable in a horizontal path of movement on said bed, turret slide ways fixedly secured to said carriage, said turret slide ways being angled at an acute angle relative to a horizontal plane through said ways, a turret slide movable on said turret slide ways, a headstock for rotatably supporting a workpiece, an indexable tool turret mounted upon said slide for rotation about a turret axis, at least ten cutting tool stations upon said tool turret, said tool stations being located at varying angular positions on said turret such that the angular arc between at least one pair of adjacent stations of said turret is an uneven multiple of the angular arc between other adjacent pairs of stations on said turret, means for mounting a tool at each of said tool stations of said turret, said tools when located at said cutting station being movable in a cutting plane which is parallel to said slide ways of said lathe, and said cutting plane of said lathe being offset from a parallel plane passing through said turret axis, first motor means for effecting rotational movement of said turret, and control means for controlling indexing movement of said turret so as to selectively locate any one of said tool stations at said cutting station, said control means being operative to actuate said first motor means so as to effect rotational movement of said turret through varying degrees of angular rotation so as to selectively locate any one of said tool stations at said cutting station.

14. The turret lathe of claim 13 in which said stations are so positioned on said turret that the total number of a particular mix of cutting tools mounted upon said turret is maximized without any one tool interfering with a workpiece supported upon said workpiece support while any other tool is operating within its cutting range upon said workpiece.

15. The turret lathe of claim 13 in which said tool mounting means includes tool mounting blocks, each of said cutting tools being mounted in one of said tool mounting blocks, and each of said tool mounting blocks being removably secured to said turret to facilitate removal and replacement of tools on said turret.

16. The turret lathe of claim 15 which further includes tool block locating means at each of said tool stations of said turret.

17. The turret lathe of claim 16 in which said locating means comprises a keyway in said turret at each of said tool stations.

* * * * *